UNITED STATES PATENT OFFICE 2,705,705
Patented Apr. 5, 1955

2,705,705

REACTION OF AN ALPHA AMINO ACID AND AN N-ACYL DERIVATIVE THEREOF

Joseph S. Chirtel and Arthur M. Mark, Chicago, Ill., assignors to Tee-Pak, Inc., a corporation of Illinois No Drawing. Application April 25, 1950,
Serial No. 158,091

9 Claims. (Cl. 260—78)

This invention relates to the preparation of new and useful amino acid polymers.

Conventional methods for the synthesis of amino acid polymers such as polypeptides, have generally been based on the concept of increasing the chain length of polymers or copolymers by the stepwise addition of successive increments of one amino acid molecule. Such methods are long, tedious, involved, difficult to control, result in low yields, and are not particularly suitable for commercial operations where polymers of a relatively high molecular weight are desired.

Other methods for synthesizing relatively high molecular weight amino acid polymers, while free from the disadvantages of the stepwise addition procedure above referred to have not been entirely satisfactory due to the difficulty of controlling and directing the reactions involved and due further to the complexity of the processes and the large equipment requirements. Furthermore, with none of the prior art methods has it been possible to obtain satisfactory yields of amino acid polymers which are substantially fat and water insoluble.

Accordingly, an important object of the present invention is the provision of a novel method for the production of amino acid polymers.

Another object is the production of novel amino acid polymers which are substantially fat and water insoluble.

A further object is to provide a novel method for the production of high molecular weight, fat and water insoluble amino acid polymers in satisfactory yield.

In its broad aspects the present invention contemplates the production of high molecular weight amino acid polymers, or polypeptides, by the direct interaction of two or more reactants in the manner of ordinary copolymerization reactions. Stated another way, the invention is directed to the production of a synthetic, protein-like linear polymer or polypeptide which is substantially insoluble in fat and water, by means of a one-step, spontaneous, thermally induced polycondensation reaction.

The invention proceeds on the concept that by blocking either the amine group or the carboxyl group of an amino acid, as by acetylation of the former or esterification of the latter, the remaining functional group would have its reactivity for peptide or polyamide formations enhanced. Generally, an N-acylated amino acid is reacted with an amino acid under condensation conditions, as will be hereinafter pointed out. While neither amino acids, such as glycine for example, or N-acylated amino acids, N-acetylglycine for example, will alone undergo thermal polymerization at atmospheric pressure, we have found that the use of an N-acylamino acid together with an amino acid does permit this type of reaction. In this connection, it appears as though the N-acylamino acids act as "starters" in the production of polypeptides according to our process, by promoting and fostering this type of reaction. While the ratio of amino acid to be reacted with an N-acylated amino acid may vary widely, we prefer to use from about 1 to 10 moles of amino acid per mole of N-acylated amino acid. The presently preferred temperature range within which the reaction mixture is maintained is from about 140° C.–250° C.

The polymerization reaction of the present invention may be conducted under superatmospheric pressures, as well as normal, or atmospheric pressures, and in some cases the use of superatmospheric pressures is preferred, as resulting in higher yields and higher D. P.'s.

In our process, the acylated acid is reacted with an α-amino acid, wherein an acylated α-amino acid may be a derivative of the same α-amino acid with which it is reacted, or it may be a derivative of a different amino acid. Thus, by way of illustration, if A and B represent different α-amino acids, then the reactants used in our process may be N-acyl A+A, N-acyl A+B, N-acyl B+B or N-acyl B+A.

Among the amino acids which may be used in accordance with the above are, for example, glycine, alanine, phenylalanine, leucine, lysine, aspartic acid, glutamic acid, tyrosine, cysteine, threonine, valine, methionine, ammobutyric acid and arginine.

Examples of N-acyl derivatives of α-amino acids which may be used are the following: N-acetyl, N-propionyl, N-benzoyl, N-carbomethoxyl and N-carboethoxyl.

Illustrative of one satisfactory procedure in practicing our invention, glycine and an N-substituted derivative of glycine in the molar ratio of from 1 to 1, to about 10 to 1, are heated slowly in a reaction chamber in the absence of air until a complete melt is realized, the heating being accompanied by stirring. The reaction may conveniently take place in a Berzelius beaker fitted with a rubber stopper with openings for the entrance and exit of a stream of inert gas, a metal stirrer and a thermometer. The shaft of the stirrer may be supported by a Monel metal sleeve bearing held rigidly by the rubber stopper. The seal is accomplished by passing a section of rubber tubing over the end of the sleeve and on to the shaft. Heat is supplied to the beaker by means of a Monel heating block containing a low melting alloy, such as Woods metal, to insure good thermal contact between beaker and heating block.

After attaining a complete melt, heating is continued until visible signs of reaction are noted, such as vigorous foaming or the expulsion of condensation products from the reaction vessel. Evolution of vapors and "setting-up" or solidification generally occur simultaneously, and further applications of heat are not made, otherwise discoloring and charring occur.

The cooled, hardened reaction products were washed and leached with hot water, and the solid residue dried in air.

The invention will be better understood by reference to the folowing specific examples which are given by way of illustration only, and are not intended to be limiting:

EXAMPLE I

*Synthesis of N-carboethoxyglycine*

Following known procedure for the synthesis of N-carboethoxyglycine, 150 gram quantity of glycine (2 moles) was dissolved in 750 ml. of water. Totals of 225 grams ethylchlorocarbonate (2.08 moles) and 200 ml. of 10 N. sodium hydroxide were added alternately in small portions with stirring. Heat was evolved. After 10 minutes, 100 grams of sodium carbonate was added and stirring continued until the reacted chlorocarbonate disappeared. The solution was then acidified with 250 cc. of concentrated hydrochloric acid and then extracted with 500 cc. portions of ethyl acetate. Evaporation of the combined extracts under reduced pressure yielded 180 grams of an oil which crystallized after standing several hours. The crude crystals were dissolved in 300 cc. of ethyl ether and the solution filtered. The addition of 14 cc. of petroleum ether to the filtrate followed by refrigeration at minus 22° C., for 18 hours, yielded 105 grams of product equivalent to 35.8% of the theoretical yield. The product melted at 73–74° C. The material was further purified by dissolving 25 grams of the impure product in 500 cc. of ethyl ether and to the solution was added 5 cc. of petroleum ether. Refrigeration at minus 22° C. yielded 14 grams of air dried products. A small sample was dried in a vacuum piston for analysis. Total nitrogen was found to be 9.78% as compared to 9.52 for the theoretical. The molecular weight by neutralization equivalent was found to be 150.5 as against 147 for the theoretical value. The product gave a negative biuret reaction. The solubility characteristics of N-carboethoxyglycine are set forth in Table 1.

TABLE 1

| Solvent | 32° C. | Boiling |
|---|---|---|
| Water | Soluble | Soluble. |
| Melted Lard | Soluble at 60° C. | |

EXAMPLE 2

*Polymerization of N-carboethoxyglycine with glycine*

A mixture of 14.7 grams of N-carboethoxyglycine (0.1 mole) and 15 grams of glycine (0.2 mole) was heated in a resin pot in an atmosphere of oxygen free nitrogen with agitation. The mixture fused at 75° C. as a clear slightly yellow melt. At 140° C. a reaction, indicated by foaming, occurred. The temperature was then maintained between 140–160° C. for a total of 103 minutes before the mixture solidified. After cooling, the amber resin (25 grams) was removed from the reaction beaker. A 15 gram quantity was leached with 100 cc. of water to dissolve the low molecular weight materials. The water insoluble residue was amorphous and gray in color. During extraction the separation of liquid and solid phases was accomplished by centrifugation. The insoluble material was washed with four 25 cc. portions of water and the mixture centrifuged each time. Dehydration under vacuum of the insoluble portion gave 2.63 grams of a product containing 19.9% total nitrogen.

Solubility characteristics of this polypeptide are set forth in Table 2 below:

TABLE 2.—SOLUBILITY CHARACTERISTICS OF N-CARBOETHOXYGLYCINE-GLYCINE COPOLYMER

| Solvent | 32° C. | Boiling |
|---|---|---|
| Water | Insoluble | Insoluble. |
| 5 N. Hydrochloric acid | do | Do. |
| 5 N. Sodium Hydroxide | Slightly Soluble | Soluble. |
| 5% Sodium Bicarbonate | Insoluble | Do. |
| Benzene | do | Insoluble. |
| Acetone | Slightly Soluble | Slightly Soluble. |
| Ether | Insoluble | Insoluble. |
| Heptane | do | Do. |
| Chloroform | do | Do. |
| Ethanol (95%) | do | Do. |
| Saturated Aqueous Urea | Slightly Soluble | Soluble. |
| Diethylamine | Insoluble | Insoluble. |
| Melted Lard | Insoluble up to 160° C. | |

The product gave a blue-violet biuret reaction. The best proportion of reactants from a standpoint of yield was found to be 1 to 2, that is, 1 of N-carboethoxyglycine to 2 of glycine.

EXAMPLE 3

*Synthesis of N-carbomethoxyglycine*

The N-carbomethoxyglycine was prepared according to known procedure as follows:

A 30 gram quantity of glycine (0.4 mole) was dissolved in 15.0 cc. water. To this solution, which was mechanically agitated, was added 39 grams of methylchlorocarbonate (0.24 mole), and 40 cc. of 10 N-sodium hydroxide, the addition being made alternately and in small portions. After 15 minutes, 20 grams of sodium carbonate was added during continuous stirring, and the solution was then acidified with 60 cc. of concentrated hydrochloric acid and extracted with 250 portions of ethyl acetate. Vacuum evaporation of the combined extract yielded 35 grams of a sirup which crystallized within about 15 minutes. The crude crystals were dissolved in 300 cc. of ethyl ether, and after filtering the mixture the filtrate was concentrated to 100 cc. and refrigerated at minus 22° C. for 18 hours. The yield amounted to 33 grams, or 62.0% of the theoretical, the product melting at 95–96° C. Total nitrogen was found to be 10.83% as compared with the calculated value of 10.53%. Molecular weight by neutralization equivalent was found to be 133.2 as against 133.0 for the theoretical value.

EXAMPLE 4

*Polymerization of N-carbomethoxyglycine with glycine*

A mixture of 13.3 grams of N-carbomethoxyglycine, prepared according to the above method, in the amount of (0.1 mole) and 15 grams of glycine (0.2 mole) was slowly heated in a resin pot with agitation under an oxygen free nitrogen atmosphere. The mixture melted at 105° C. The reaction began about 160° C. as evidenced by foaming, and the mixture was maintained between 160–170° C. for 30 minutes at which time solidification occurred. A total of 22 grams of yellow-orange product was obtained. A 13 gram quantity of this material was leached out with water as described in the preceding examples. A 1.7 gram residue of gray amorphous water insoluble product was obtained which contained 20.9% of total nitrogen. The solubility characteristics of this copolymer are summarized in Table 3 set forth below:

TABLE 3.—SOLUBILITY CHARACTERISTICS OF N-CARBOMETHOXYGLYCINE-GLYCINE COPOLYMER

| Solvent | 35° C. | Boiling |
|---|---|---|
| Water | Insoluble | Insoluble. |
| 5 N. Hydrochloric Acid | do | Do. |
| 5 N. Sodium Hydroxide | do | Slightly Soluble. |
| 5% Sodium Bicarbonate | do | Insoluble. |
| Benzene | do | Do. |
| Acetone | do | Do. |
| Ether | do | Do. |
| Heptane | do | Do. |
| Chloroform | do | Do. |
| Ethanol (95%) | do | Do. |
| Saturated Aqueous Urea | Slightly Soluble | Soluble. |
| Diethylamine | Insoluble | Insoluble. |
| Melted Lard | Insoluble up to 160° C. | |

This material gave a strongly positive biuret reaction.

EXAMPLE 5

*Copolymerization of N-acetylglycine and glycine*

N-acetylglycine was prepared from acetic anhydride and glycine according to known procedures, such as the procedure described in Organic Syntheses, vol. XIX, p. 4, Wiley, New York, N. Y. (1939), and then reacted with glycine as follows:

Quantities of 0.1 mole of N-acetylglycine and 0.3 mole of glycine were reacted as in the preceding example. The mixture began to melt at 145° C. The reaction mass was held within a temperature range of 145–70 for 105 minutes with agitation, and in an inert atmosphere. The further processing was carried out as in the preceding examples, giving as the end product a yellow brown resin having a total nitrogen content of 17.6%, giving a positive biuret test and having a molecular weight of 480 which corresponds to an average D. P. between about 8 and 9. The water insoluble residue was a yellow powder on drying, having a melting point in excess of 270° C.

EXAMPLE 6

*Copolymerization of N-acetylalanine and glycine*

13.1 g. of N-acetylalanine (0.1 mole) and 15 g. of glycine (0.2 mole) were heated in a resin pot in a nitrogen atmosphere, with agitation. Melting of the reactants occurred at 118° C. The heating was continued slowly, and a reaction, as evidenced by foaming, started at 168° C. The temperature was maintained within 155–175° C. for 116 minutes. As the reaction mix cooled, vapors were drawn off by aspiration. After cooling, the reaction mixture was found to weigh 20 grams. A 10 gram sample was digested in water, and centrifuged in the usual manner, resulting in 1.19 g. of a water and fat insoluble material, which gave a strongly positive biuret reaction. Nitrogen content was found to be 19.6%.

EXAMPLE 7

*Copolymerization of N-propionylglycine with glycine*

0.2 mole of glycine was heated with 0.033 mole of N-propionylglycine in a nitrogen atmosphere, with agitation. A yellow orange melt was obtained at 180° C. and the mix was heated for an additional 20 minutes before solidification occurred. A green-brown amorphous mix was obtained. This was repeatedly leached with hot water leaving 4.5 grams of insoluble residue which gave a strongly positive biuret reaction and had a nitrogen content of 20.8%.

EXAMPLE 8

Copolymerization of N-acetylphenylalanine and phenylalanine 0.05 mole (8.25 g.) of phenylalanine and 0.014 mole (2.91 g.) of N-acetylphenylalanine were heated in a resin pot in a nitrogen atmosphere with agitation. A clear, pale, yellow melt was realized at 215° C., accompanied by the emission of vapors. Condensation proceeded for 70 minutes, at which point the mix had set-up to a yellow resinous solid. The solid material (yield 8.14 g.) was first leached with acetone to remove any decomposition products, as well as any unconverted acetyl derivative, and then with hot water. After centrifugation, the solid material was dried in vacuo to give 2.03 g. of a white amorphous solid, which showed a positive biuret test and had a total nitrogen content of 9.72%.

EXAMPLE 9

Copolymerization of N-acetylglycine and glycine under superatmospheric pressure 0.1 mole (715 g.) of glycine and 0.033 mole (3.9 g.) of N-acetylglycine were heated in a glass lined steel reactor at 500 p. s. i. g., in a nitrogen atmosphere provided by a nitrogen stream, for 90 minutes at 175° C.

8.85 g. of crude product was obtained and this was repeatedly leached with hot water to give 4.01 g. of a gray amorphous powder. This represented a yield, based on the crude product, of 45.3%. The product showed a positive biuret reaction, and a total nitrogen content of 22.4%, the latter showing that the polymer contained at least eleven peptide units.

EXAMPLE 10

Copolymerization of N-benzoylglycine and leucine 0.05 mole (4.45 g.) of leucine and 0.025 mole (4.47 g.) of N-benzoylglycine were heated in a glass-lined steel reactor at 500 p. s. i. g., in a nitrogen atmosphere for 180 minutes at 200° C. The reaction mix provided 7.80 g. of a hard, resinous solid which was washed with acetone rather than water, since the decomposition products proved to be tacky in the presence of hot water. The solid material was separated by centrifugation and then dried in vacuo, giving 1.60 g. (20.5% yield) of a light, pink amorphous solid, which gave a positive biuret test and had a total nitrogen content of 11.98%.

EXAMPLE 11

Polymerization of N-benzoylglycine with glycine

N-benzoylglycine (0.1 mole) produced according to any known method, and glycine (0.2 mole), were mixed and heated in the manner described for the N-acetylglycine example. A clear orange melt was obtained at 165° C. together with signs of reaction, as indicated mainly by the rapid evolution of reaction vapor. The temperature was raised over a period of 35 minutes to 185° C. whereupon solidification occurred. On cooling, an orange, pliable, amorphous mass, giving a strong positive biuret test resulted.

A 50.2 gram quantity of the crude product prepared as above was washed with ether, acetone and water in the order named, in order to effect a separation of benzoic acid, unreacted N-benzoylglycine and any water insoluble fraction. The ether and acetone extract upon evaporation to dryness yielded 3.0 grams of N-benzoylglycine. The presence of benzoic acid was not detected therein. The water insoluble residue accounted for 1.65 grams of the original crude product. Since the solution which remained gave a positive biuret test, there was indicated therein lower peptides besides unreacted glycine known to be present.

A 0.96 gram portion of the water insoluble residue was hydrolyzed with sodium hydroxide under reflux over a period of 4 hours in order to cleave the chain. The hydrolysate was then acidified and chilled to 0° C. The solid which crystallized from the solution was collected, dried, and the melting point of the material, 122° C. confirmed the presence of the benzoyl group at some point or points along the polypeptide chain.

The total nitrogen analysis of the water insoluble fraction before cleavage was 16.5%.

The method of the present invention is simple, straightforward and lends itself readily to large-scale application.

The resulting product is a polypeptide or mixture of polypeptides which has excellent film-forming properties, is substantially water and fat insoluble, displays many of the familiar characteristics of material proteins, and is particularly useful in the preparation of edible films. The reactants used are, furthermore, simple materials which are either readily available or may be easily prepared in large quantities.

While the invention has been particularly described in terms of specific examples, it is not intended that the invention be limited to these or any other specific embodiments, since variations within the scope of the invention will readily suggest themselves to those skilled in the art.

We claim:

1. A method for producing a linear polymer which is substantially fat and water insoluble, which comprises heating a mixture of glycine and N-carboethoxyglycine in molar proportions of from about 1 to 10 moles of glycine per mole of N-carboethoxyglycine, in an inert atmosphere until solidification occurs after the initial melting of the reactants, cooling the solidified reaction mixture, and removing water soluble components from said cooled reaction mixture.

2. A method for producing a linear polymer which comprises heating a mixture of glycine and N-acetylglycine in molar proportions of from about 1 to 10 moles of glycine per mole of N-acetylglycine, in an inert atmosphere until solidification occurs after the initial fusion of the reactants, cooling the solidified reaction mixture, and removing the hot water soluble fraction of said cooled reaction mixture.

3. A method for producing a linear polymer which comprises heating a mixture of glycine and N-benzoylglycine in molar proportions of from about 1 to 10 moles of glycine per mole of N-benzoylglycine, in an inert atmosphere until solidification occurs after the initial melting of the reactants, cooling the solidified reaction mixture, and removing water soluble components from said cooled reaction mixture.

4. A method for producing a linear polymer which comprises heating a mixture of glycine and N-acetylalanine in molar proportions of from about 1 to 10 moles of glycine per mole of N-acetylalanine, in an inert atmosphere until solidification occurs after the initial melting of the reactants, cooling the solidified reaction mixture and removing water soluble components therefrom.

5. The product of the method of claim 1.

6. A method for producing a substantially water and fat insoluble polymer which comprises heating to fusion temperature an alpha amino acid with up to an equimolar quantity of an N-acyl derivative of an alpha amino acid having the structural formula

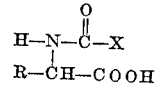

where R is a radical selected from the group consisting of hydrogen and alkyl and X is a radical selected from the group consisting of alkyl, aryl and alkoxyl.

7. A method for producing a substantially water and fat insoluble, film forming polymer which comprises heating a mixture of glycine in molar excess, and an N-acyl derivative of glycine having the structural formula

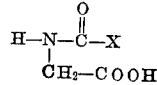

where X is a radical selected from the group consisting of alkyl, aryl, and alkoxyl, in an inert atmosphere to a temperature of from about 140° to 250° C., cooling the reaction mixture and removing the unreacted ingredients.

8. A method for producing a fat and water insoluble polymer material which comprises heating a mixture of an alpha-amino acid and an N-acyl derivative of an alpha amino acid, having the structural formula

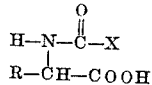

where R is a radical selected from the group consisting of hydrogen and alkyl and X is a radical selected from the group consisting of alkyl, aryl and alkoxyl, in molar proportions such that from about 1 to 10 moles of alpha amino acid is reacted with one mole of the said acyl derivative of an alpha amino acid, in an oxygen free atmosphere until the molten reactants solidify and removing water and fat soluble components from said reaction mixture after cooling.

9. A method for producing a linear polymer which is subbstantially fat and water insoluble which comprises heating a mixture of an alpha-amino acid and an N-acyl derivative of an alpha amino acid, having the structural formula

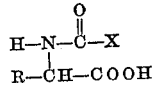

where R is a radical selected from the group consisting of hydrogen and alkyl and X is a radical selected from the group consisting of alkyl, aryl and alkoxyl, in molar proportions of from about 1 to 10 moles of the alpha amino acid per mole of the said derivative of an alpha amino acid, in an inert atmosphere, under super-atmospheric pressure, and at a temperature of from about 140 to 150° C. until the molten reactants solidify.

References Cited in the file of this patent

FOREIGN PATENTS

| 60,399 | Denmark | Nov. 23, 1942 |
| 870,599 | France | Mar. 16, 1942 |

OTHER REFERENCES

Fischer, Berichte der Deut. Chem. Gesel., vol 40, 1907, pp. 1754, 1760 to 1764.

Frankel et al., Journal American Chemical Soc., vol. 64, 1942, pp. 2264 to 2271.

Advances in Protein Chemistry, vol. V, article by Fruton, pp. 1 and 21 to 23.